Jan. 16, 1934.    R. S. SANFORD    1,943,842
BRAKE
Filed Sept. 21, 1931    2 Sheets-Sheet 1

INVENTOR.
ROY S. SANFORD
BY  O.H. Fowler
ATTORNEY.

Jan. 16, 1934.   R. S. SANFORD   1,943,842
BRAKE
Filed Sept. 21, 1931   2 Sheets-Sheet 2
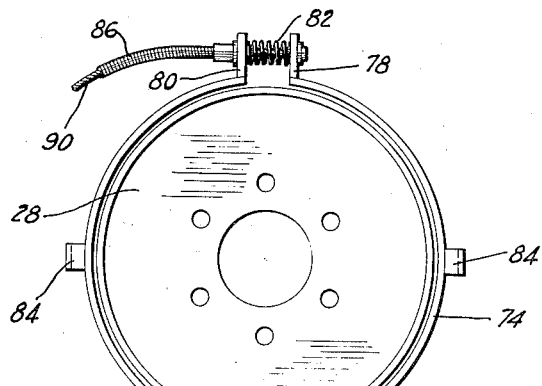
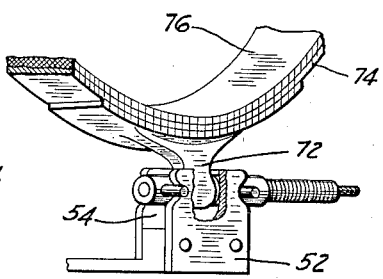
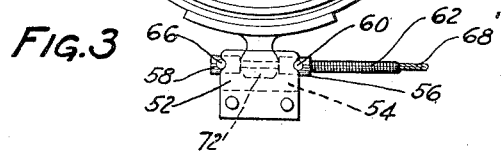
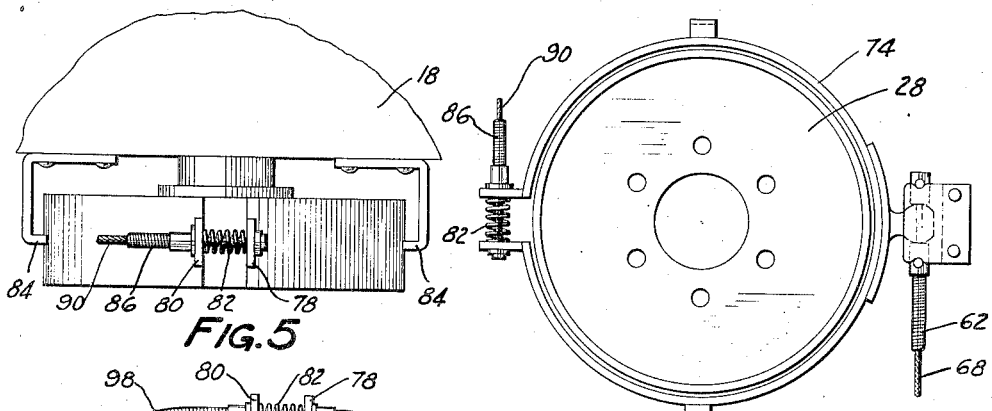
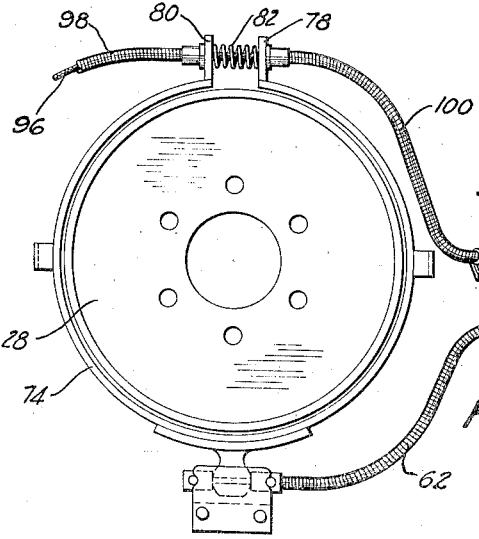
INVENTOR.
ROY S. SANFORD
BY
ATTORNEY.

UNITED STATES PATENT OFFICE 1,943,842

BRAKE

Roy S. Sanford, South Bend, Ind., assignor to
Bendix Aviation Corporation, South Bend, Ind.,
a corporation of Delaware Application September 21, 1931
Serial No. 563,922

4 Claims. (Cl. 188—140)

This invention relates to brakes and more particularly to means for applying a plurality of brakes through a single operating means.

Broadly, the invention comprehends means for applying a transmission brake and operating a plurality of brakes through the action of the transmission brake.

An object of the invention is to provide means for applying a transmission brake including means for imposing tension and compression on the respective ends of a friction element.

Another object of the invention is to provide means for applying a transmission brake and means associated therewith for concomitantly applying a plurality of brakes upon actuation of the transmission brake.

Yet a further object of the invention is to provide means for applying a transmission brake and means controlled through the operation of the transmission brake for automatically applying a plurality of brakes.

A further object of the invention is to provide means for applying a brake and means operable by the actuation of the brake for applying another brake.

Other objects of the invention will appear from the following description taken in connection with the drawings, which form a part of this specification, and in which:

Figure 3 is an enlarged detail view illustrating the drum and friction element;

Figure 4 is an enlarged detail view illustrating the mounting of the friction element;

Figure 5 is an enlarged detail view illustrating the return springs for the friction element;

Figure 6 is an enlarged detail view illustrating a modification of the drum and friction element; and Figure 7 is an enlarged detail view illustrating a further modification.

Figure 1:
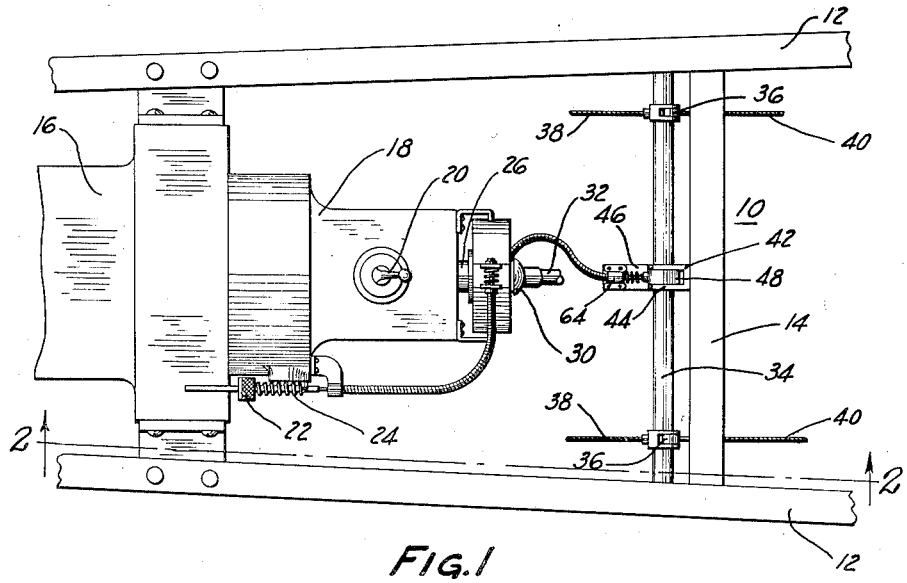
Figure 1 is a top plan view of a motor vehicle chassis illustrating the invention as applied.

Referring to the drawings for more specific details of the invention, 10 represents generally a motor vehicle chassis frame comprising side rails 12 connected by cross bars 14. An engine 16 is suitably supported on the frame and bolted or otherwise secured to the engine casing is a transmission housing 18 enclosing suitable transmission mechanism controlled through a suitable lever 20. A brake mechanism is operated through a foot pedal lever 22 having connected thereto a suitable return spring 24.

The driven shaft 26 of the transmission has secured thereto a drum 28 and connected to the shaft as by a universal joint 30 is a driving shaft 32 suitably connected to a differential, not shown.

Suitably supported on the side rails of the frame 10 is a rock shaft 34 having thereon rock arms 36 connected respectively through tension members 38 and 40 to front and rear brakes, not shown. The shaft 34 is further supported by a bracket 42 having parallel arms 44 and a dependent arm 46 and secured to the shaft between the parallel arms on the bracket is a rock arm 48 limited in its movement by an adjustable stop 50.

Supported on the transmission casing 18 is a bracket 52 having a slot 54. This bracket supports oppositely disposed fittings 56 and 58 arranged in oppositely disposed relation in the slot. The fitting 56 is secured by a transverse pin 60 abutting the bracket 52 to one end of a conduit 62, the other end of which is secured to a suitable clip 64 on the dependent arm 46 on the bracket 42 and secured to the fitting 58 by a transverse pin 66 abutting the bracket 52 is one end of a cable 68, the other end of which is suitably secured to the rock arm 48 with a spring 70 wound on the cable between the rock arm and the clip.

The cable 68 has positioned thereon in the slot 54 in the bracket 52 a sleeve 72 supporting a split band 74 encircling the drum 28. The band has secured thereto a suitable lining 76 and is provided at its separable ends with flanges 78 and 80 between which is positioned a spring 82. The spring serves to return and retain the band in proper spaced relation to the braking surface of the drum against suitable brackets 84 on the transmission housing when the brake is in the off position.

Suitably secured to the flange 80 on the band 74 is one end of a conduit 86, the other end of which is secured to a bracket 88 on the transmission housing. A cable 90 positioned in the conduit has one end secured to the flange 78 on the band and its other end secured to the foot pedal lever 22.

When the foot pedal lever is depressed the cable 90 is placed under tension and the conduit 86 is placed under compression. The cable 90 and the conduit 86 are connected to the respective separable ends of the band 74. Hence, upon depression of the lever the band is contracted to engage the drum. Assuming that the drum is rotating counterclockwise as the band engages the drum, it is given a slight rotational movement. This movement of the band forces the sleeve 72 against the fitting 56 on the end of the conduit 62 causing flexing or bending of the conduit resulting in placing tension on the cable 68 and hence, a pull on the rock arm 48, resulting in applying the brakes connected to the tension members 38 and 40.

When the drum is rotating clockwise and the foot pedal is depressed to place the cable 90 under tension and the conduit 86 under compression to apply the band to the drum, the resulting rotational movement of the drum places tension on the cable 68 causing a direct pull on the rock arm 48 resulting in application of the brakes controlled through the tension members 38 and 40.

Figure 2:
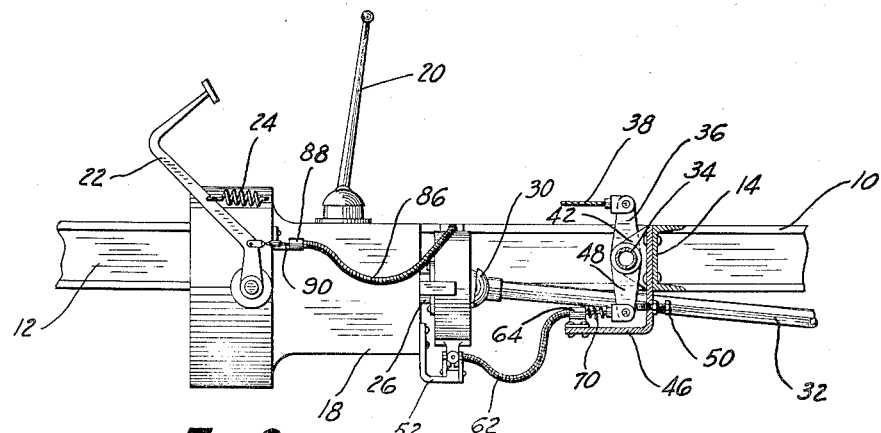
Figure 2 is a longitudinal section of a view substantially on line 2—2, Figure 1.

In Figure 6, the conduit 62 and cable 68 are arranged in reverse of the arrangement shown in Figures 2 and 3, so that a direct pull is placed on the cable when the drum is rotating in counterclockwise direction to apply the brakes controlled through the tension members 38 and 40. In both instances, the cable 68 is retained under tension by the spring 70 wound thereon between the clip 64 and the rock arm 48.

A modification is illustrated in Figure 7 wherein a bracket 92 supporting the rock arm 34 has adjacent thereto a rock arm 94 secured to the shaft and connected by a cable 96 passing through the flanges of the band and connected to the foot pedal lever 22.

The cable is enclosed by two sections of conduit 98 and 100, one of which has one end connected to the flange on the brake band and its other end connected by a clip to the bracket 92. The other section has one end connected to the flange on the brake drum and its other end connected to the bracket 88 on the transmission housing. This arrangement provides upon depression of the pedal for a direct pull on the cable resulting in rocking the cross shaft 34 to apply the brakes controlled through the tension members 38 and 40. Concomitantly with the operation, the conduit sections 98 and 100 are compressed to contract the band on the drum resulting in the application of the transmission brake and further actuation of the rock shaft 34 through the cable 68, so that concomitant operation of the transmission brake and the brakes controlled through tension members 38 and 40 is attained and the applied force on the brakes operated through the tension members 38 and 40 may be augmented by an additional applied force resulting from the actuation of the transmission brake.

It is to be understood that the forms of the invention herein shown and described are to be taken as preferred examples and that various changes may be resorted to without departing from the spirit or scope of the subjoined claims.

Having thus described the various features of the invention, what I claim as new and desire to secure by Letters Patent is:

1. A brake mechanism for an automotive vehicle comprising a transmission brake, a rock shaft, brake control elements connected to the rock shaft, means for actuating the transmission brake and means for anchoring the friction element of the transmission brake and also operable to rock the shaft, said latter means comprising a slotted bracket secured to the chassis of the vehicle and further comprising cable and conduit members operably connected to and mounted within said slotted member, one of said members being also operatively connected to said rock shaft.

2. A brake mechanism comprising a rotatable drum, a friction band associated therewith, means for contracting the band against the drum, a rock shaft, brake operating elements connected to the rock shaft, a fixed support, a conduit having one end connected to the fixed support and its other end connected to the band and a cable in the conduit having one end connected to the band and its other end connected to the rock shaft.

3. A brake mechanism comprising a transmission brake including a rotatable drum, a band associated therewith, means for contracting the band against the drum, a rock shaft, brake control elements connected to the rock shaft, and means for rocking the shaft automatically upon application of the transmission brake including a compression member and a tension member connected between the rock shaft and the transmission brake.

4. A brake mechanism for an automotive vehicle provided with a drive shaft, a rotatable drum mounted on said shaft, friction means associated with said drum, brake operating means, a manually operable brake applying member and force transmitting connections interconnecting said manually operable member, friction means and brake operating means for simultaneously operating said friction means and said brake operating means, together with means interconnecting said brake operating means and friction means operable upon operation of the friction means to actuate the brake operating means.

ROY S. SANFORD.